Oct. 28, 1958     S. P. SEXTON     2,857,654
INTERWOVEN FABRIC FOR VEHICLE TOPS OR THE LIKE
Filed July 6, 1956
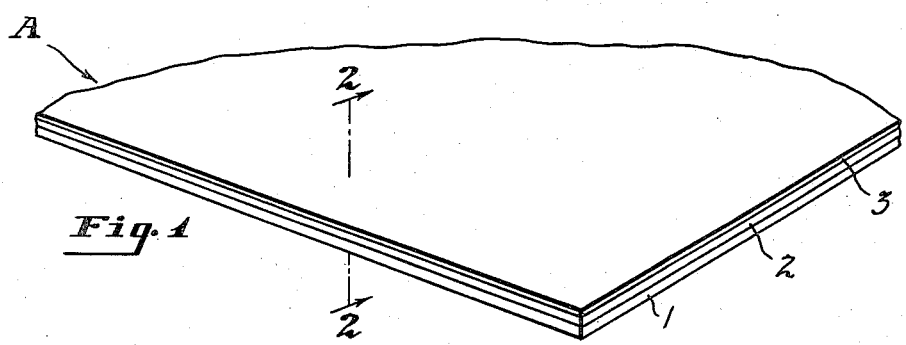
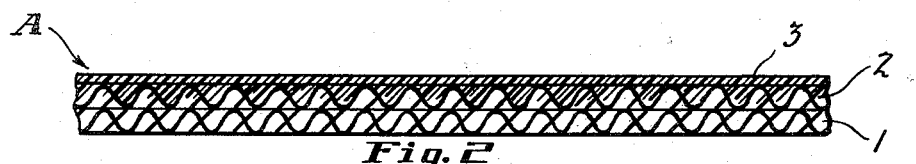
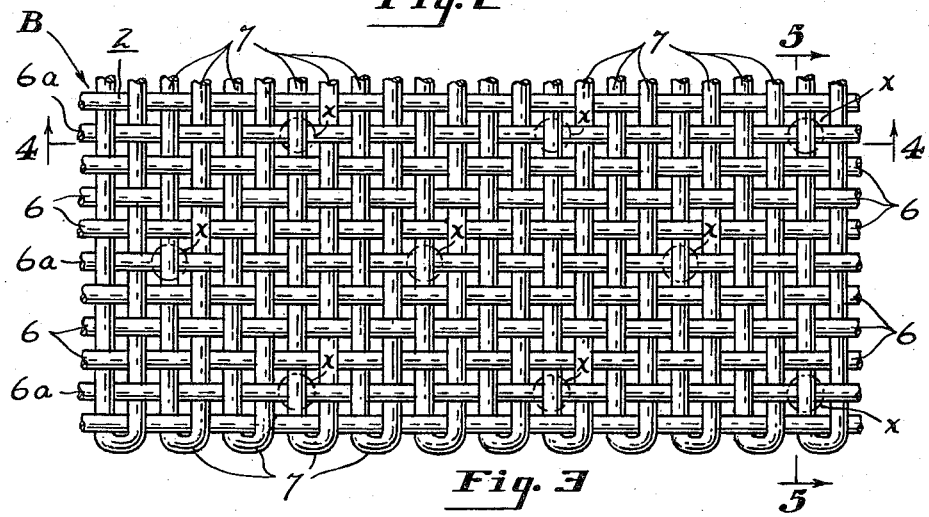
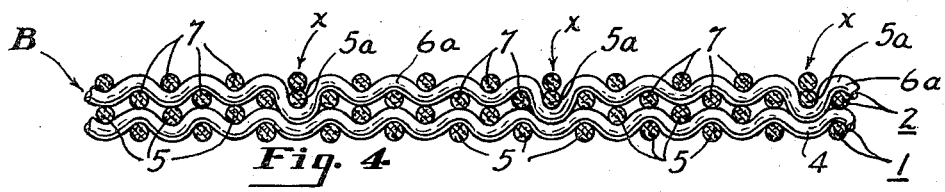
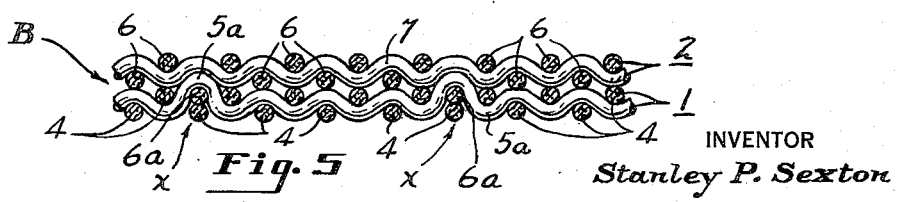
INVENTOR
Stanley P. Sexton
BY *McCoy, Greene & Grotenhuis*
ATTORNEYS

United States Patent Office 2,857,654
Patented Oct. 28, 1958

2,857,654

INTERWOVEN FABRIC FOR VEHICLE TOPS OR THE LIKE

Stanley P. Sexton, Toledo, Ohio, assignor to The General Tire & Rubber Company, Summit, Ohio, a corporation of Ohio Application July 6, 1956, Serial No. 596,301

6 Claims. (Cl. 28—80)

The present invention relates to a plastic-coated interwoven fabric for vehicle tops or the like and more particularly to a coated fabric having two layers which are interwoven and joined at a multiplicity of closely spaced points.

Heretofore, plastic-coated fabric sheets have been unsatisfactory for convertible tops since the plastic penetrated the fabric and was visible on the fabric sides of the sheets. This difficulty could not be overcome satisfactorily by cementing an extra fabric layer to the sheet since the adhesive also tended to mar the appearance of the exposed fabric. Furthermore the adhesives did not provide a satisfactory bond between the fabric layers.

The present invention provides a method of making a plastic-coated fabric sheet wherein the plastic is not visible on the fabric side of the sheet. This is accomplished by weaving a double-cloth fabric consisting of an upper cross-woven layer and a lower cross-woven layer having threads which are interlocked with threads of the upper layer. The two layers are interwoven at a series of closely spaced points so that the layers are securely fastened together. A thin layer of a suitable plastic material may then be applied to one layer of the two-ply fabric sheet to render the sheet waterproof. The plastic may readily be applied without striking through both layers so that the plastic will not be visible on the fabric side of the sheet. The resulting laminated sheet has a high strength due to the two layers of fabric and is well suited for use as a convertible vehicle top because of the pleasing appearance of the exposed fabric layer. The extra fabric also tends to prevent water from dripping around the seams due to its wicking action.

An object of the present invention is to provide a strong, inexpensive fabric having a water-repellent plastic surface and an exposed fabric surface whose appearance is not marred by the plastic.

A further object of the invention is to provide an improved plastic-coated fabric material for convertible vehicle tops or the like.

Other objects, uses and advantages of the present invention will become apparent to those skilled in the art from the following description and claims and from the drawings in which;

Figure 1 is a fragmentary perspective view on an enlarged scale showing the plastic-coated laminated sheet of the present invention;

Figure 2 is a fragmentary vertical sectional view taken on the line 2—2 of Figure 1 and on a larger scale;

Figure 3 is a fragmentary view of the sheet shown in Figures 1 and 2 on a larger scale, the places where the upper and lower fabric layers are joined together being indicated by dot-dash circles;

Figure 4 is a fragmentary longitudinal vertical sectional view taken on the line 4—4 of Fig. 3 and on the same scale; and Figure 5 is a fragmentary transverse vertical sectional view taken on the line 5—5 of Fig. 3 and on the same scale.

Referring more particularly to the drawings, in which like parts are identified by the same numerals throughout the several views, Figs. 1 and 2 show a plastic-coated duplex fabric sheet A suitable for convertible tops or the like. This sheet consists of a bottom layer 1 of cross-woven fabric, an upper layer 2 of cross-woven fabric interwoven with the bottom layer, and a plastic top layer 3 bonded to the layer 2 and extending into the interstices of the fabric to impregnate the fabric. The plastic of the layer 3 penetrates substantially through the layer 2 but does not impregnate the layer 1. The plastic, therefore, is not visible when looking at the surface of the layer 1, even where the color of the plastic is substantially different from the color of fabric layer 1. Thus, the exposed surface of the layer 1 will be white where the threads are white even though the plastic is black. The exposed surface of the fabric layer 1 looks the same as the surface of a conventional uncoated fabric even though the threads of that layer are interwoven with the threads of the layer 2.

Figures 3 to 5 show the construction of the double-cloth fabric B employed in the present invention, the cloth being shown prior to the application of the plastic material. The cross-woven fabric layer 1 comprises a multiplicity of warp threads 4 and a multiplicity of weft threads 5 interwoven with the warp threads in a conventional manner. The cross-woven fabric layer 2 is of a similar construction and comprises a multiplicity of warp threads 6 and a multiplicity of weft threads 7 interwoven with the warp threads in a conventional manner. However, the fabric of the lower layer 1 includes a series of regularly spaced weft threads 5a which are interwoven with the warp threads 4 and are also interwoven with a series of regularly spaced warp threads 6a of the upper layer 2. Each of the threads 6a is interwoven with the weft threads 7 as well as the weft threads 5a as best shown in Figs. 4 and 5.

The cross-woven fabric layers 1 and 2 are, therefore, interwoven and connected at a series of regularly spaced locations x indicated by dot-dash circles in Fig. 3. Such a double-cloth weaving operation is easily performed on a conventional Jacquard loom as will be apparent to those skilled in the art.

As shown in the drawings the layers 1 and 2 of the sheet B are tightly secured together by the interwoven threads 5a and 6a which cross at the points x. As shown in Fig. 4, each warp thread 6a passes under the weft thread 5a, over the adjacent weft thread 7 and is interwoven with seven of the weft threads 7 before it passes under the next adjacent weft thread 5a. As shown in Fig. 5, each thread 5a passes over the warp thread 6a and is interwoven with seven of the warp threads 4 before it passes over the next adjacent warp thread 6a. The weft threads 5a and warp threads 6a regularly spaced so that the intersecting points x form a regular pattern as shown in Fig. 3. As herein shown, three regularly spaced weft threads 5 are located between each connecting thread 5a and the next adjacent connecting thread 5a, the threads 5 and 5a being equally spaced throughout the width of the fabric sheet. The warp threads 6 and 6a are similarly arranged, three threads 6 being located between adjacent threads 6a. All of the warp and weft threads of both fabric layers 1 and 2 are regularly spaced as indicated in Fig. 3.

The warp and weft threads (4 to 7) of the double-cloth fabric B may be made of various fibrous materials such as silk, cotton, nylon, rayon, Dacron, Perlon or the like and more than one type of material may be used for the different threads.

The upper fabric layer 2 of the sheet B may be impregnated with any suitable plastic coating material to render the laminated sheet waterproof. The amount of plastic used, however, is preferably sufficient to form an impervious layer 3 which completely covers the threads of the fabric layer 2. The plastic material should also be flexible and resistant to cracking.

The coating composition which is applied to the layer 2 may be a suitably plasticized and stabilized high polymeric film-forming material, such as a material which is rendered plastic at temperatures from 200° to 400° F. and which may be applied by conventional calendering methods. The coating composition may be polyurethane or polyethylene. However, the preferable coating composition is a thermoplastic polyvinyl resin such as polymers and copolymers of mono-olefinic materials having the general formula,

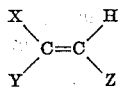

where C is carbon, H is hydrogen, X is a halogen, such as chlorine, fluorine and bromine (preferably chlorine), Y is selected from the group consisting of hydrogen and said halogen (including fluorine, chlorine, bromine and iodine), and preferably from the group consisting of hydrogen and chlorine, and Z is selected from the group consisting of hydrogen and said halogen. Examples of such mono-olefinic compounds include vinyl halide compounds, such as vinyl chloride, vinylene chloride (1,2-dichloro-ethylene), vinyl fluoride, vinylidene chloride, vinyl bromide, acetylene dichloride, and the like having less than three halogen groups.

Copolymers of a major portion (preferably at least 80%) of the above-mentioned mono-olefinic compounds and a minor portion (preferably less than 20%) of copolymerizable monoolefinic compounds, such as chlorovinyl acetate, dimethyl maleate, diethyl maleate, maleic acid or compounds of the general formula,

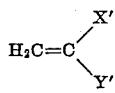

also provide suitable plastics for the sheet material of the present invention, where X' is a member of the group consisting of hydrogen, methyl and ethyl groups, and where Y' is a member of the group consisting of cyanide, carboxyl and esterified carboxyl groups.

Examples of the last-named compounds included under said general formula are vinyl acetate, acrylonitrile, methyl acrylate, ethyl acrylate, methyl acrylonitrile, methyl methacrylate, ethyl methacrylate, acrylic acid and the like. Suitable copolymers may contain groups such as

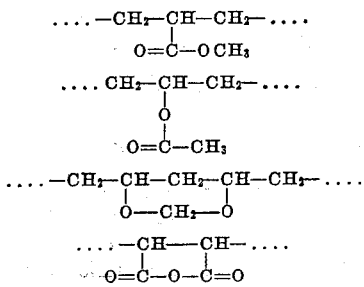

or the like.

Some or all of the carboxy groups of the copolymers may be hydrolyzed to form hydroxyl groups, and in some cases the hydrolyzed copolymers may thereafter be condensed with suitable aldehydes to form vinyl acetals. Mixtures of a major portion of the polyvinyl halide compound with a minor portion of polyethyl acrylate, polymethyl methacrylate, polyacrylonitrile, polyvinyl acetate, or the like also provide suitable plastic compositions.

Since it is preferable to employ inexpensive vinyl resins which can be calendered easily and which can be stabilized and plasticized to form a highly flexible durable plastic layer, it is usually preferable to employ polymers or copolymers made principally from vinyl chloride or the like. The copolymers preferably are at least 80 percent polyvinyl chloride and preferably have a molecular weight of about 10,000 to 30,000.

Polymers of vinylhalide compounds well suited for the laminated fabric sheets of the present invention include polyvinyl chloride, copolymers or vinyl chloride and vinyl acetate (Vinylite), copolymers of vinyl chloride and vinylidene chloride, polyvinylidene chloride, vinyl acetals, such as polyvinyl butyral, etc.

The polymer of vinyl halide employed in making the waterproof fabric of the present invention is compounded in the ordinary manner with suitable stabilizers such, for example as lead or tin salts, with pigments such, for example, as titanium dioxide ($TiO_2$) or carbon black, and with suitable plasticizers of the monomeric and/or polymeric type. The monomeric plasticizers are more effective at low temperatures than the polymeric plasticizers but have a greater tendency to migrate particularly when present in large amounts. The polymeric plasticizers are satisfactory at ordinary temperatures and have less tendency toward migration but are not preferred for low temperatures. It is, therefore, usually preferable to employ a mixture of monomeric and polymeric plasticizers in the cement.

Examples of monomeric plasticizers are tricresyl phosphate, trioctyl phosphate, tributyl phosphate, cresyl diphenyl phosphate, dioctyl adipate, dioctyl phthalate, diamyl phthalate, diethoxy ethyl phthalate, and the like. The polymeric plasticizers include (1) nitrile rubbers, which are copolymers of butadiene and vinyl cyanide, and copolymers of butadiene and methylisopropenyl ketone, and (2) polyesters, such as polypropylene glycol adipate, polyethylene glycol adipate, polypropylene glycol sebacate, or other viscous condensation products of a polyethylene glycol and a polybasic acid having a molecular weight of around 1,000 to 40,000.

The plasticizers present in the plastic material of the layer 3 are preferably a mixture of (1) a polymeric plasticizer, such as a nitrile rubber, and/or a viscous polyester, such as polyethylene or polypropylene glycol adipate with (2) a monomeric plasticizer, such as dioctyl adipate, dibutyl phthalate, tricresyl phosphate, or the like. The amount of the plasticizers is sufficient to provide the desired amount of flexibility and extensibility and is usually about 20 to 100 parts by weight per 100 parts by weight of the polyvinyl chloride or other vinyl resin.

The pigments are used to obtain the desired color and to enhance the resistance of the material to sunlight. The amounts of the pigments are around 1 to 50 parts (and preferably less than 20 parts) by weight per 100 parts by weight of plasticized polyvinyl resin polymer (resin plus plasticizer).

The plasticized thermo-plastic material may be applied to the fabric layer 2 by a conventional calendering operation or by the use of a doctor blade or the like. It is often preferable, however, to apply the plastic in two separate operations to insure proper adhesion of the plastic to the fabric. In the first operation, a prime coating of a suitable latex or other suitable adhesive may be applied to the fabric layer 2 by a printing roller or a doctor blade. The prime coat may be any material suitable for adhering a polyvinyl halide compound to fabric. Thereafter, the major portion of the plastic may be applied by means of the conventional calendering operation. It will be understood that the prime coating operation may be omitted, particularly where cotton fabric is employed.

Suitable prime coatings may be prepared in an aqueous emulsion consisting of around 55 to 65 parts by weight of polyvinyl chloride latex and about 45 to 35 parts by weight of a nitrile rubber in addition to the water.

Example I

A plasticized polyvinyl coating composition is prepared having the following composition:

| | Parts by weight |
|---|---|
| Vinyl resin (polyvinyl chloride) | 100 |
| Polyethylene glycol adipate | 55 |
| Dioctyl phthalate | 15 |
| Filler (calcium carbonate) | 20 |
| Pigment | 15 |
| Barium cadmium laurate | 1.5 |
| Tin laurate | 0.5 |

A latex prime coating composition is then prepared consisting of 55 parts by weight of polyvinyl chloride and 45 parts by weight of a nitrile rubber in aqueous emulsion, the nitrile rubber being a copolymer of butadiene and acrylonitrile formed from about 60 percent butadiene and 40 percent acrylonitrile.

The latex prime coating composition is then applied by a printing roller to one side face only of a double-cloth interwoven fabric sheet similar to the sheet B shown in Figs. 3 to 5 so as to wet the sheet and apply the latex throughout its width and length, said fabric sheet having a dry weight of 10.3 ounces per square yard prior to the application of the latex and a dry weight of 11.3 ounces per square yard after said application of latex.

The plasticized polyvinyl composition described above is then calendered onto the latex-impregnated side only of the fabric sheet to form a continuous impervious plastic layer which completely covers the fabric like the layer 3 shown herein. The dry weight of the sheet after calendering is 23 ounces per square yard, the finished sheet having a uniform thickness like the sheet A shown herein.

None of the plastic material strikes through or impregnates the second layer of fabric so that the plastic does not detract from the appearance of the exposed fabric surface and is not visible from the fabric side of the sheet. The polyvinyl plastic adheres well to the fabric and is very flexible.

Example II

A plastic-coated fabric is prepared as in Example I replacing the plasticized polyvinyl chloride composition with the following composition:

| | Parts by weight |
|---|---|
| Vinyl resin | 100.0 |
| Dioctyl phthalate | 20.0 |
| Octyl/decyl phthalate | 20.0 |
| Plastolein 9720 (complex fatty-acid ester) | 10.0 |
| Paraplex G-50 (a high molecular weight polyester) | 10.0 |
| Filler (calcium carbonate) | 10.0 |
| Pigment | 8.0 |
| Basic lead carbonate | 3.0 |
| Fused lead stearate | 1.0 |
| | 182.0 |

The vinyl resin constituents in the above composition may be polyvinyl chloride or copolymers (including hydrolyzed copolymers) containing a minor portion (for example, 5%) of a copolymerized monomer, such as vinyl acetate, vinylidene chloride, diethyl maleate, ethyl acrylate, methyl acrylate, methyl methacrylate, ethyl methacrylate, or the like. The vinyl chloride component of the resin in the specified example given above is preferably from 92% to 95% and the minor proportion of a copolymerized monomer is preferably less than 8%. The percentage of hydroxyl groups in the hydrolyzed copolymers (hydrolyzed carboxyl groups) should also be low.

In the foregoing example, the dioctyl phthalate and octyl/decyl phthalate, Plastolein 9720 and Paraplex G-50 form the plasticizing agents in the resin composition. The basic lead carbonate and fused lead stearate provide the stabilizers in the specific composition given above.

The resulting sheet is very attractive and durable, has the desirable properties of the sheet of Example I making it very suitable for use in the top material for vehicles of the so-called "convertible" type.

Example III

A plastic-coated fabric sheet is prepared as in Examples I and II replacing the plasticized polyvinyl composition with the following composition:

| | Parts by weight |
|---|---|
| Vinyl resin (polyvinyl chloride) | 100.0 |
| Dioctyl phthalate | 35.0 |
| Dioctyl azelate | 20.0 |
| Epoxy type stabilizer (Paraplex G-62) | 5.0 |
| Filler (calcium carbonate) | 20.0 |
| Pigment | 15.0 |
| Barium cadmium laurate | 2.0 |

In the foregoing example, dioctyl phthalate and dioctyl azelate form suitable plasticizers in the composition, although other conventional plasticizers may be used. The Paraplex G-62 (epoxy type stabilizer) and barium cadmium laurate function as stabilizers in the resin.

The resulting sheet has all the desirable properties of the sheet of Example II and is well suited for use in making convertible tops or the like.

It will be understood that the above description is by way of illustration rather than of limitation and that, in accordance with the provisions of the patent laws, variations and modifications of the specific articles disclosed herein may be made without departing from the spirit of the invention.

Having described my invention, I claim:

1. A plastic-coated multiple-ply fabric for convertible vehicle tops or the like comprising a first layer of cross-woven fabric having a series of closely spaced warp threads and a series of closely spaced weft threads interwoven with said warp threads, a second layer of cross-woven fabric having a series of closely spaced warp threads and a series of closely spaced weft threads interwoven with said last-named warp threads, said first layer having a series of widely spaced weft threads which are interwoven with said first-named warp threads of said first layer and with a series of widely spaced warp threads in said second layer, said widely spaced warp threads being interwoven with said widely spaced weft threads and with the closely spaced weft threads of said second layer at closely spaced points so as to prevent separation of said layers and to hold the layers in contact throughout the length and breadth of each layer, and a layer of a flexible polymeric material bonded to one of said cross-woven fabric layers, the spacing of the threads in one layer being generally the same as the spacing of the threads in the other layer.

2. A composite waterproof fabric comprising a plurality of superposed cross-woven fabric layers, each layer having a series of regularly spaced parallel connecting threads, a plurality of regularly spaced intermediate threads between each connecting thread and the next adjacent connecting thread and parallel thereto, and a multiplicity of regularly spaced threads perpendicular to and interwoven with said connecting threads and said intermediate threads, the connecting threads of one layer being perpendicular to the connecting threads of the other layer and being looped around said threads at a series of closely spaced points securely to attach the fabric layers together and to hold said fabric layers in intimate contact throughout the length and breadth of each layer, one of said fabric layers being impregnated with a plastic water-repellent material to prevent the passage of water through the fabric layers.

3. A waterproof fabric as defined in claim 2 wherein said plastic material comprises a pigmented polymer of a vinyl halide compound.

4. A plastic-coated fabric as defined in claim 1 wherein said plastic material is a compound of a polymer of a fluid having a major proportion of vinyl chloride.

5. A fabric as defined in claim 2 wherein the number of intermediate threads in each layer is less than ten times the number of connecting threads in that layer.

6. A fabric as defined in claim 5 wherein said plastic material is polyvinyl chloride.

References Cited in the file of this patent

UNITED STATES PATENTS

| | | |
|---|---|---|
| 2,356,456 | Garner | Aug. 22, 1944 |
| 2,502,101 | Morgan et al. | Mar. 28, 1950 |
| 2,755,535 | Schoenberger | July 24, 1956 |
| 2,771,661 | Foster | Nov. 27, 1956 |